United States Patent
Chen et al.

(10) Patent No.: US 10,650,579 B2
(45) Date of Patent: May 12, 2020

(54) SYSTEMS AND METHODS OF DISTANCE-BASED SHADERS FOR PROCEDURALLY GENERATED GRAPHICS

(71) Applicant: Microsoft Technology Licensing, LLC, Redmond, WA (US)

(72) Inventors: Tong Chen, Bellevue, WA (US); Morien Thomas, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 71 days.

(21) Appl. No.: 15/827,888

(22) Filed: Nov. 30, 2017

(65) Prior Publication Data
US 2019/0164336 A1    May 30, 2019

(51) Int. Cl.
*G06T 15/80*    (2011.01)
*G02B 27/01*    (2006.01)
*G06F 3/01*    (2006.01)
*G06F 3/03*    (2006.01)

(52) U.S. Cl.
CPC .......... *G06T 15/80* (2013.01); *G02B 27/0172* (2013.01); *G06F 3/011* (2013.01); *G06F 3/013* (2013.01); *G06F 3/0304* (2013.01); *G02B 2027/014* (2013.01); *G02B 2027/0138* (2013.01)

(58) Field of Classification Search
CPC ................ G06T 15/80; G02B 27/0172; G02B 2027/0138; G02B 2027/014; G06F 3/011; G06F 3/013; G06F 3/0304
USPC ......................................................... 345/426
See application file for complete search history.

(56) References Cited

U.S. PATENT DOCUMENTS

| | | | |
|---|---|---|---|
| 8,035,641 B1 | 10/2011 | O'Donnell | |
| 9,734,633 B2 | 8/2017 | Bennett et al. | |
| 2006/0221076 A1* | 10/2006 | Takahashi | G06T 13/20 345/427 |
| 2013/0050432 A1 | 2/2013 | Perez et al. | |

(Continued)

OTHER PUBLICATIONS

"International Search Report and Written Opinion Issued in PCT Application No. PCT/US2018/061164", dated Feb. 13, 2019, 11 Pages.

(Continued)

*Primary Examiner* — King Y Poon
*Assistant Examiner* — Vincent Peren
(74) *Attorney, Agent, or Firm* — Ray Quinney & Nebeker P.C.; John O. Carpenter

(57) ABSTRACT

An electronic system for displaying visual information to a user includes a head-mounted display (HMD) including a near-eye display (NED), a microprocessor in data communication with the NED, and a storage device in data communication with the microprocessor. The storage device has instructions stored thereon that, when executed by the microprocessor, cause the microprocessor to perform a method. The method includes identifying an origin point and target point and calculating an object distance between the origin point and the target point in three-dimensional space. The target point is part of a virtual object that is procedurally generated. The object distance is used to adjust a threshold value of a distance test. The method further includes determining a shader value for the target point and applying a shader to the target point to create a shaded virtual object. The shaded virtual object is then displayed to the user with the NED.

20 Claims, 5 Drawing Sheets

(56) References Cited

U.S. PATENT DOCUMENTS

| | | |
|---|---|---|
| 2014/0078172 A1 | 3/2014 | Systrom et al. |
| 2014/0125670 A1 | 5/2014 | Saulters |
| 2016/0180503 A1 | 6/2016 | Frascati et al. |
| 2016/0253830 A1 | 9/2016 | Yuan et al. |
| 2016/0292923 A1* | 10/2016 | Balachandreswaran ............ G02B 27/017 |
| 2017/0200309 A1* | 7/2017 | Qian ............ G06T 15/04 |
| 2018/0275410 A1* | 9/2018 | Yeoh ............ H04N 13/344 |

OTHER PUBLICATIONS

"MonoGame HLSL Shader Example for a Post-Processing Blur Effect", Retrieved from<<http://www.software7.com/blog/monogame-hlsl-shader-example-for-a-post-processing-blur-effect/>>, Apr. 12, 2013, 6 Pages.

"XNA Shader Programming", Retrieved from<<https://digitalerr0r.wordpress.com/2009/05/16/xna-shader-programming-tutorial-20-depth-of-field/>>, May 16, 2009, 7 Pages.

* cited by examiner

SYSTEMS AND METHODS OF DISTANCE-BASED SHADERS FOR PROCEDURALLY GENERATED GRAPHICS

CROSS-REFERENCE TO RELATED APPLICATIONS

N/A

BACKGROUND

Use of computing devices is becoming more ubiquitous by the day. Computing devices range from standard desktop computers to wearable computing technology and computers integrated into many commonplace devices. Due to the variety of device and applications, computing devices are being used in an ever-increasing variety of environments and conditions.

Wearable computing devices such as augmented reality (AR), mixed reality (MR), and virtual reality (VR) head-mounted displays are used in a variety of environments. Head-mounted displays (HMDs) display visual information to a user through a near-eye display (NED). The visual information is conventionally presented to the user to replicate objects, data, or other visual information in the visible environment from the user's perspective. For example, the visible environment of a VR HMD replaces the user's view of the surrounding physical environment with a virtual environment displayed to the user on the NED.

In another example, the visible environment of a MR HMD is a shared environment that combines the surrounding physical environment of the user and a virtual environment presented on a transparent or translucent NED. In other words, the visible environment of a MR HMD includes physical objects and information of the surrounding physical environment visible to the user through a transparent display and virtual objects and information of the virtual environment displayed on the transparent display. The virtual objects and information are overlaid onto the user's view of the physical environment to combine the physical environment and virtual environment into a shared environment.

SUMMARY

In some embodiments, an electronic system for displaying visual information to a user includes a head-mounted display (HMD) including a near-eye display (NED), a microprocessor in data communication with the NED, and a storage device in data communication with the microprocessor. The storage device has instructions stored thereon that, when executed by the microprocessor, cause the microprocessor to perform a method. The method includes identifying an origin point and target point and calculating an object distance between the origin point and the target point in three-dimensional space. The target point is part of a virtual object that is procedurally generated by the microprocessor. The object distance is used to adjust a threshold value of a distance test. The method further includes determining a shader value for the target point and applying a shader to the target point to create a shaded virtual object. The shaded virtual object is then displayed to the user with the NED.

In some embodiments, a method of presenting visual information to a user includes identifying an origin point and target point and calculating an object distance between the origin point and the target point in three-dimensional space. The target point is part of a virtual object that is procedurally generated by a microprocessor. The object distance is used to adjust a threshold value of a distance test. The method further includes determining a shader value for the target point and applying a shader to the target point to create a shaded virtual object. The shaded virtual object is then displayed to the user with a NED.

In some embodiments, a computer readable medium has instructions stored thereon that, when executed by a microprocessor, cause the microprocessor to perform a method. The method includes identifying an origin point and target point and calculating an object distance between the origin point and the target point in three-dimensional space. The target point is part of a virtual object that is procedurally generated by the microprocessor. The object distance is used to adjust a threshold value of a distance test. The method further includes determining an interpolated shader value for the target point from the distance test and applying a shader to the target point to create a shaded virtual object. The shaded virtual object is then displayed to the user with a NED.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

Figure 1:
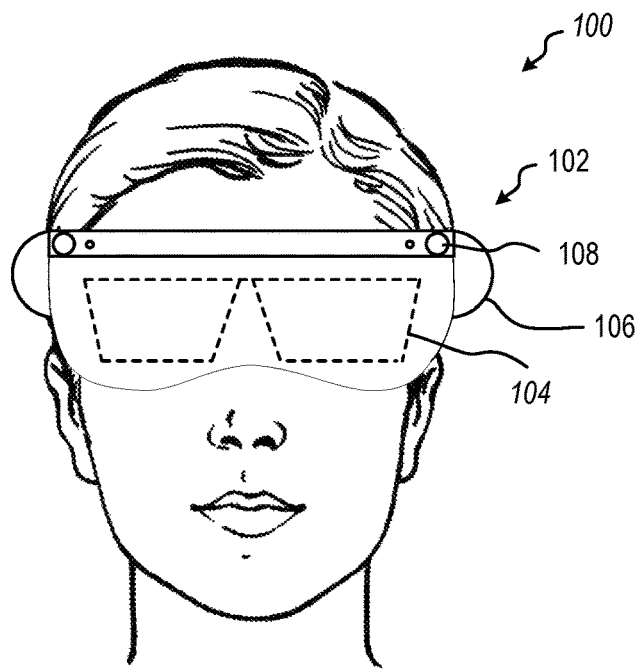
FIG. 1 is a perspective view of a user wearing an embodiment of a head-mounted display (HMD), according to the present disclosure.

This disclosure generally relates to devices, systems, and methods for improving interaction with objects presented to a user in a virtual environment. In at least one embodiment, this disclosure relates to devices, systems, and methods for improving interaction with objects presented to a user in a virtual environment in a head-mounted display (HMD). A system may present a user one or more virtual objects in a virtual reality, mixed reality, or augmented reality environment. The virtual objects may be presented to the user visually overlaid with the physical surroundings or in a fully virtual presentation. In some embodiments, the virtual environment may include one or more reconstructions of surfaces or objects in the physical environment, such as a wall, a floor, or a table.

A virtual object presented to the user may be presented with other virtual objects to provide depth, perspective, context, or other visual information about the displayed scene. For example, a near-eye display of the HMD may present a virtual object at a simulated depth from the user within the virtual environment. The display of virtual objects in the virtual environment may be altered depending on the visual information to be provided to the user. For example, an object of interest to the user may be highlighted and/or may have attention drawn to it by blurring other virtual objects. In another example, the virtual objects in the virtual environment may be altered to create a depth of field based at least partially on the user's gaze, the user's position, and/or user interactions with the virtual environment.

In some embodiments, at least a portion of the virtual environment may be or include procedurally generated graphics. In other embodiments, the procedurally generated graphics may be mixed with parametric graphics or pre-rendered elements in the virtual environment. Conventionally, the alteration of the virtual objects includes the application of one or more post-processing techniques, such as supersampling, multisampling, other anti-aliasing, blur shaders, other shaders, or other types of post-processing. For example, a shader may be any specialized program for calculating rendering effects on graphical elements. A shader may be used to perform shading (i.e., the production of desired levels of light, darkness, and color in a displayed image) or may perform any visual alteration to a graphical element. For example, a shader may alter the hue, saturation, brightness or contrast of an image; produce blur, light bloom, volumetric lighting, normal mapping for depth effects, bokeh, cel shading, posterization, bump mapping, distortion, chroma keying (so-called "bluescreen/green-screen" effects), edge detection or motion detection, and other effects. While flexible, applying shaders in post-processing is time and resource intensive. Post-processing requires the generation of the graphics before post-processing can be applied and the images can be rendered on a display to the user. In a HMD or other wearable computing device, processing power, memory capacity, bandwidth, available power, thermal management, and other operational parameters may be more limited than a conventional desktop and/or laptop computer.

A method of displaying visual information to a user according to the present disclosure may reduce the computing power, data file size, energy consumption, or combinations thereof needed to produce visual effects and/or alterations to the virtual environment based at least partially upon the distance from a procedurally generated virtual object and another point in the virtual environment. In some examples, a HMD may display one or more virtual objects to a user in combination with the surrounding physical environment of the user in a mixed reality application.

In at least one embodiment, the visual effects and/or alterations to the virtual environment based at least partially upon the distance between objects may be beneficial for the comfort and ease-of-use of the user. For example, visual effects and/or alterations to the virtual environment based at least partially upon the distance between objects may allow for less eye fatigue and/or ease of focusing on the virtual information over the duration of a usage session.

FIG. 1 is a front view of a user 100 wearing a HMD 102. In some embodiments, the HMD 102 may have one or more near-eye displays (NEDs) 104 to present virtual information to the user 100 supported by a housing 106. The housing 106 may further support one or more cameras 108 to image a surrounding physical environment of the user 100. The camera 108 may be a depth camera that may collect a three-dimensional image of the user's surrounding physical environment. For example, the camera 108 may be an active depth camera including an illuminator for structured light or time of flight depth measurements. In another example, the camera 108 may be a passive depth camera without an illuminator, such as a stereo camera with two imaging sensors displaced from one another.

The NED 104 may include a single near-eye display that provides virtual information to both eyes, or a plurality of discrete NEDs 104 that provide virtual information to each eye. The virtual information may include virtual objects displayed on a transparent display, such as a transparent waveguide or other transparent NEDs 104; or on an opaque display, such as a liquid crystal display, a light emitting diode display, a projected laser display (e.g., a microelectromechanical system display), or other opaque NEDs 104.

In some embodiments, a NED 104 with a transparent waveguide may include a display module that houses components such as: one or more light sources (e.g., one or more light emitting diodes (LEDs)); one or more microdisplay imagers, such as liquid crystal on silicon (LCOS), liquid crystal display (LCD), digital micromirror device (DMD); and one or more lenses, beam splitters, and/or waveguides. Displayed images in the form of light rays emitted from the display module may be optically in-coupled into a waveguide comprising a substrate made of a light transmissive material (e.g., a glass or polymer). The in-coupled light rays are then propagated along the waveguide through total internal reflection (TIR) between the front and back surfaces of the waveguide substrate to a location at which they are out-coupled from the substrate and directed towards an eye of the user. The in-coupling and out-coupling of light rays to and from the substrate may be accomplished through the use of diffractive optical elements (DOEs), for example, in the form of surface relief gratings (SRGs) arranged on or proximate to a surface of the substrate. As mentioned, the resulting effect of the output light rays may be the display of generated images that, from the point of view of the user, overlay the user's view of the surrounding real world through the transparent waveguide.

The NED 104 may include a plurality of pixels, with each pixel representing an addressable display point through which light is output and combined to form a displayed image. Pixels may include multiple sub-elements, for example, each configured to output light of a particular color. For example, in an RGB color model, each display pixel may include three light emitting elements (e.g., LEDs), and each lighting element may be configured to output light of a particular component color (e.g., red, green, or blue) at varying intensities.

Figure 2:
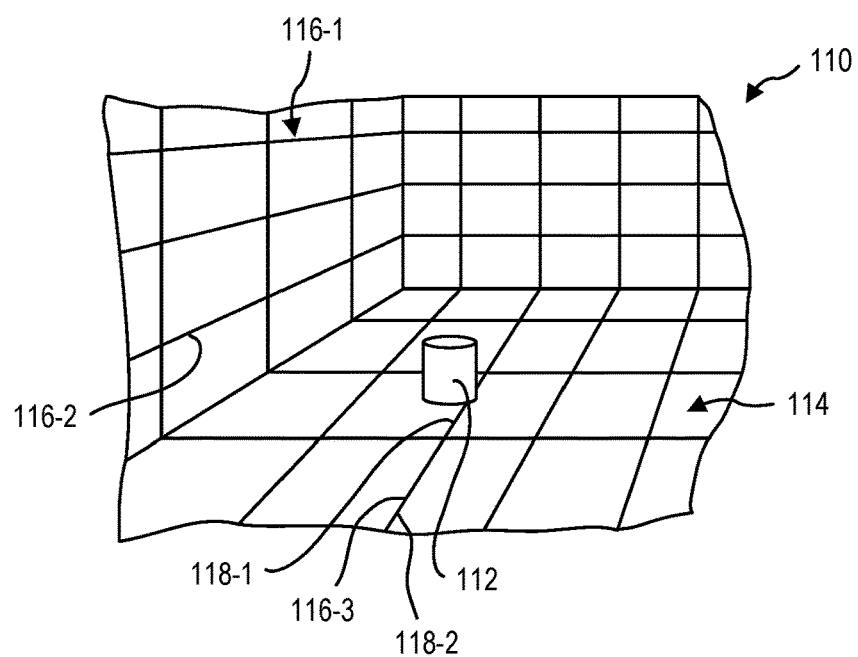
FIG. 2 is a perspective view of an embodiment of a virtual environment with at least one procedurally generated object within the virtual environment, according to the present disclosure.
Figure 3:
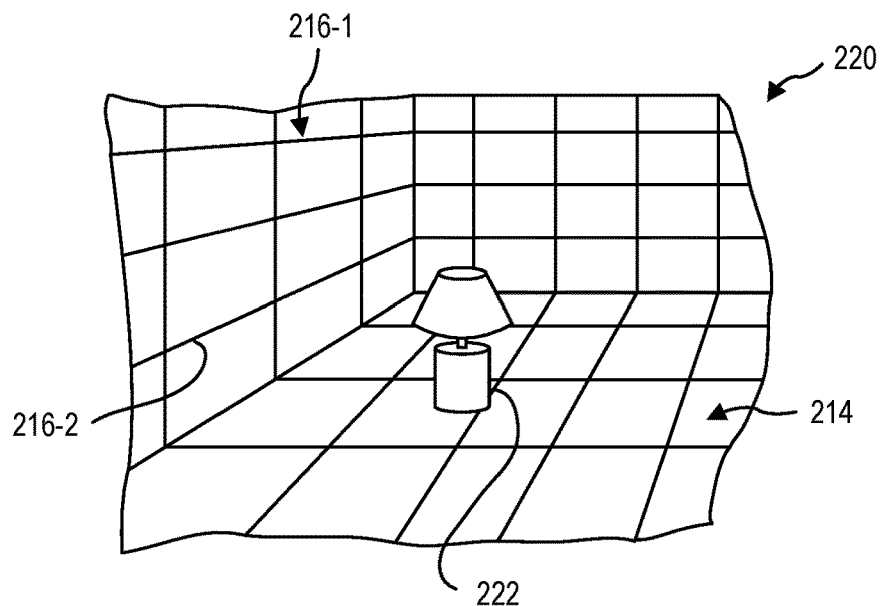
FIG. 3 is a perspective view of an embodiment of a shared (virtual and physical) environment with at least one procedurally generated object within the shared environment, according to the present disclosure.

The HMD may present a virtual object to a user that is altered based upon proximity with another object. FIGS. 2 and 3 illustrate embodiments of an HMD simulating at least one virtual object in a virtual environment and in a shared environment, respectively.

FIG. 2 is an illustration of a virtual environment 110 with an origin object 112 and a procedurally generated object 114. The origin object 112 may be a prerendered graphical element, a parametrically generated graphical element, a procedurally generated graphical object, or other graphical element positioned in the virtual environment 110. In some examples, the procedurally generated object 114 may include a single element, such as a single primitive graphical object. Primitive graphical objects include geometric objects such as quadrilaterals, triangles, line segments, or other polygons. In other examples, the procedurally generated object 114 may include a plurality of elements 116-1, 116-2, 116-3. The plurality of elements 116-1, 116-2, 116-3 may allow a more complex graphical element to be rendered, such as the procedurally generated grid illustrated in FIG. 2.

A procedurally generated object 114 is a graphical element that is rendered by a central processing unit (CPU), graphical processing unit (GPU), other microprocessor, other processing device, or combinations thereof. In some embodiments, a procedurally generated object is dynamically created by providing a set of parameters or rules and allowing the CPU, GPU, or other processing devices to create an object that adheres to the given parameters or rules. This is in contrast to a prerendered object that has set aspect ratios, textures, dimensions, or other precomputed and stored properties. Procedural generation allows for the real-time creation of graphical elements to populate a virtual space on demand from an application or operating system (OS) without needing to store the assets in or read the assets from a storage device.

For example, a tree may be generated procedurally by defining a number of leaves and allowing the computing system to calculate an associated quantity of branches and junctions to be filled in at various lengths of branches and positions of the junctions to achieve the requisite number of leaves. In other embodiments, procedurally generated graphics may allow for predetermined degree of randomness. For example, each tree generated in such a fashion may have the same number of leaves, but may be unique in structure. Procedural generation, therefore, may allow the dynamic creation of graphical elements in the virtual environment to meet requirements while allowing for a smaller file size and lower system resource requirements by creating the procedurally graphical objects as needed.

FIG. 2 illustrates a virtual environment 110 in which the procedurally generated object 114 includes a grid that simulates boundaries of a room around an origin object 112. The barrel in the center of the room may be a focal point of the room. In some embodiments, it may be beneficial to maintain the barrel in focus and blur the graphical elements in the remainder of the virtual environment 110. As mentioned, conventional graphic rendering would render the entire virtual environment and apply a blur shader to all elements of the room in post-processing. However, rendering with post-processing shaders is resource intensive: demanding increased processing power, memory bandwidth, energy consumption, and time.

In some embodiments according to the present disclosure, the procedurally generated object 114 may be rendered in real-time using a shader, such as a blur shader, applied to the procedurally generated object 114 during rendering of the procedurally generated object 114. For example, different elements 116-1, 116-2, 116-3 of the procedurally generated object 114 may be located at different distances from the origin object 112. In the presently illustrated example, different lines in the grid may be located at different distances from the barrel. A first element 116-1 may be located at a greater distance from the origin object 112 than the second element 116-2. A shader may be applied to the procedurally generated object 114 during rendering that alters the first element 116-1 a different amount than the second element 116-2 due to the difference in displacement from the origin object 112. In at least one example, a blur shader may blur the first element 116-1 more than the second element 116-2 because the first element 116-1 is farther from the origin object 112 than the second element 116-2.

Furthermore, a particular element may have a portion that is closer to the origin object 112 than another portion. In the embodiment illustrated in FIG. 2, a third element 116-3 of the procedurally generated object 114 has a first portion 118-1 that is adjacent the origin object 112 and a second portion 118-2 that is positioned farther away from the origin object 112. A shader may be applied to the procedurally generated object 114 during rendering that alters the first portion 118-1 a different amount than the second portion 118-2 due to the difference in displacement from the origin object 112. In at least one example, a blur shader may blur the first portion 118-1 less than the second portion 118-2 because the first portion 118-1 is closer to the origin object 112 than the second portion 118-2.

FIG. 3 illustrates generating a virtual environment including a procedurally generated object 214 in a shared environment 220 with at least one physical object 222. For example, the physical object 222 may be an object of interest of the physical environment, and the procedurally generated object 214 may be a grid representing a wall and/or floor of a room in the virtual environment. The procedurally generated object 214 may be generated and presented to a user by applying a shader in real-time during rendering of the procedurally generated object 214. The procedurally generated object 214 may be displayed to a user via a near-eye display in an HMD to replicate a user's visual focus on the physical object 222 in the shared environment 220.

In some embodiments, the shader may be applied differently to the procedurally generated object 214 depending on the distance of the procedurally generated object 214 from the physical object 222. The coordinates of the virtual environment and the physical environment are related to one another in the shared environment 220. For example, the physical object 222 may be positioned in the physical environment, while the procedurally generated object 214 may be moved in the virtual environment. As the procedurally generated object 214 moves in the shared environment 220, therefore, the procedurally generated object 214 may "react" to the relative distance from the physical object 222 in the shared environment 220.

The distance-based shader effects described in the present application may help enhance realism and improve the experience of user interaction. To apply the shader effects during the procedural generation of certain graphical elements, a script may be used with one or more specialized shaders. The script and specialized shaders may be implemented in one or more locations in a computing system.

Figure 4:
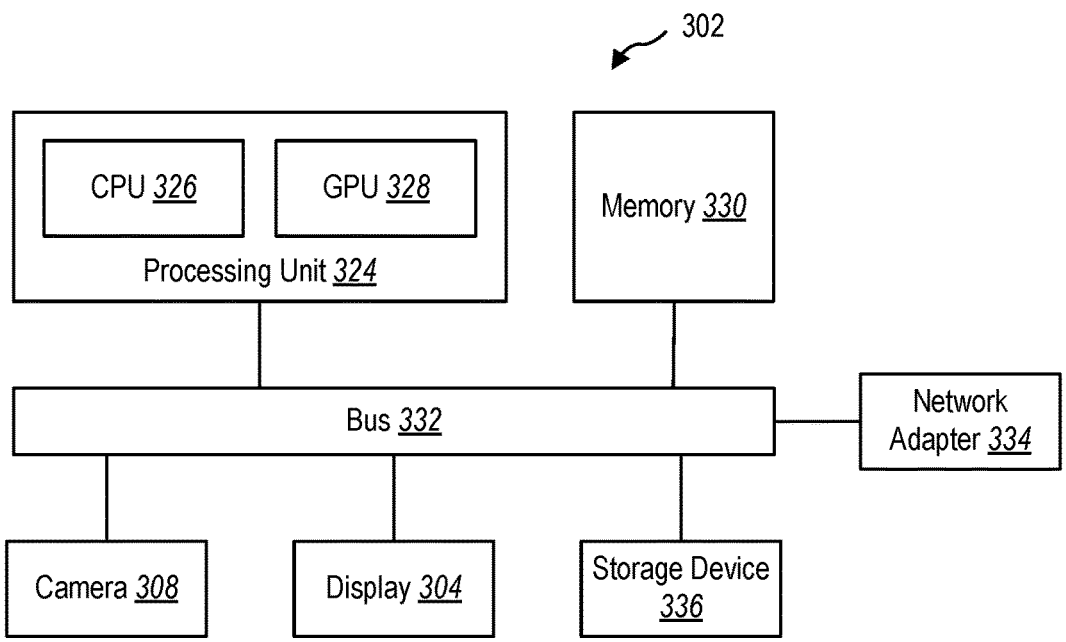
FIG. 4 is a system diagram of an embodiment of a computing system of an HMD, according to the present disclosure.

FIG. 4 illustrates an embodiment of a computing system of an HMD 302, according to the present disclosure. In some embodiments, the HMD 302 may be a self-contained computing system that is contained within the wearable housing (such as housing 106 illustrated in relation to FIG. 1). In other embodiments, the computing system of the HMD 302 may be a distributed system having one or more components described herein located remotely from the wearable housing. In at least one example, the HMD may be tethered to a desktop or workstation computing system. In at least another example, at least a portion of the computing system may be accessible through a network or the internet, such as including access to cloud computing to supplement the graphical processing of the computing system or cloud storage to supplement the data storage of the computing system of the HMD 302. In various embodiments, at least a portion of the computing system of the HMD 302 may include a server computer, a client computer, a personal computer (PC) (e.g., a laptop or desktop computer), a mobile smart phone, a tablet computer, another wearable computer, a gaming console, or any machine capable of executing a set of instructions (sequential or otherwise) that specify actions to be taken by a computer system.

In some embodiments, the HMD 302 may include a processing unit 324, memory unit 330, a bus 332 that allows communication between computing system components, a network adapter 334, a storage device 336, and additional input, output, and display devices, such as a camera 308, a display 304 (such as NED 104 described in relation to FIG. 1), or combinations thereof. In some embodiments, the processing unit 324 may include a central processing unit (CPU) 326 and a graphics processing unit (GPU) 328. Note that the CPU 326 and GPU 328 are show in FIG. 4 as discrete components for illustrative purposes. However, in some embodiments, one or more aspects of the described CPU 326 and GPU 328 may be integrated into a single processing unit 324.

While the memory unit 330 (i.e., volatile memory and/or non-volatile memory) and storage device 336 (sometimes individually or collectively referred to as "machine-readable medium") are each shown to be a single medium, the term "machine-readable medium" and "storage medium" should be taken to include a single medium or multiple media (e.g., a centralized or distributed database, and/or associated caches and servers) that store one or more sets of instructions, scripts, or data. The term "machine-readable medium" and "storage medium" shall also be taken to include any medium that is capable of storing, encoding, or carrying a set of instructions for execution by the computing system and that cause the computing system to perform any one or more of the techniques of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions set at various times in various memory and storage devices in the HMD 302, and that, when read and executed by one or more processing units 324 or processors (e.g., CPU 326 or GPU 328), cause the computing system of the HMD 302 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices, floppy and other removable disks, hard disk drives, optical disks (e.g., Compact Disk Read-Only Memory (CD-ROM), Digital Versatile Disks (DVDs), BLU-RAY disks), and transmission type media such as digital and analog communication links.

The network adapter 334 may enable the computing system and/or HMD 302 to mediate data in a network with an entity that is external to the HMD, through any known and/or convenient communications protocol supported by the computing system of the HMD 302 and the external entity. The network adapter 334 can include one or more of a network adaptor card, a wireless network interface card, a router, an access point, a wireless router, a switch, a multi-layer switch, a protocol converter, a gateway, a bridge, bridge router, a hub, a digital media receiver, and/or a repeater.

Components of the HMD 302 may be used in graphics processing, for example, including shader computations during procedural generation of graphical elements. For example, the computer system may be use a graphics pipeline that processes one or more shaders for rendering a graphics element. A graphics processing pipeline may include a series of operations, which may be specified by shaders that are performed during procedural generation of graphical elements. These pipelines are generally designed to allow efficient processing of digital graphics, while taking advantage of available hardware.

In general, a GPU 328 is a processing unit that facilitates graphics rendering. The GPU 328 can be used to process vast amount of data-parallel computations efficiently. The GPU 328 can be used to render any visual output including images, animations, text, and/or video for display to a user via the display 304. In some embodiments, a GPU 328 can be located, for example, on selectively removable and/or replaceable cards, in a chipset on the motherboard, or integrated into the same chip as the CPU 326. In an embodiment, a GPU 328 (e.g., on a video card) can include hardware memory or access hardware memory. In some embodiments, a memory unit(s) 330 that functions as both system memory (e.g., used by the CPU 326) and video memory (e.g., used by the GPU 328) can be employed. In other embodiments, a memory unit 330 that functions as system memory (e.g., used by the CPU 326) may be separate from a memory unit 330 that functions as video memory (e.g., used by the GPU 328). As can be appreciated, in some embodiments, the functionality of the GPU 328 may be emulated in software, for example, executed by the CPU 326 with an associated increase in processing time, as the CPU 326 is tasked with additional computations.

Figure 5:
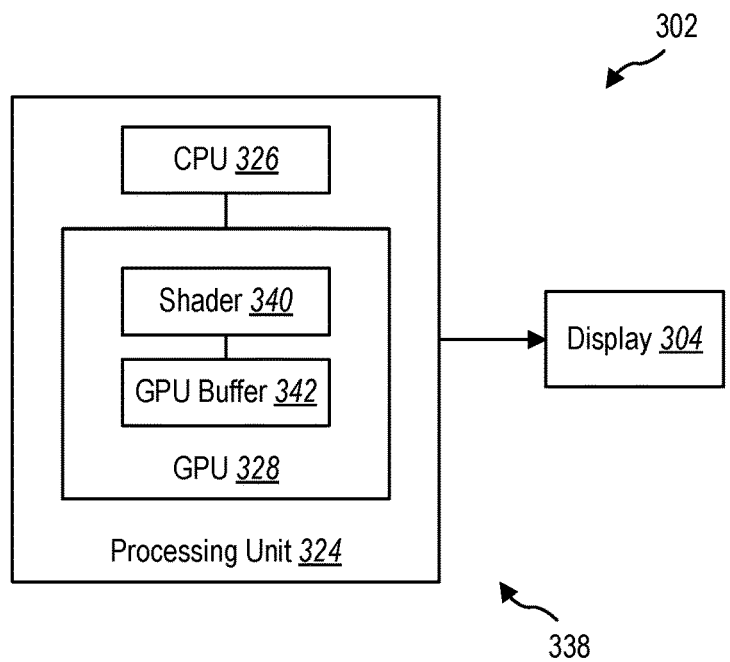
FIG. 5 is a block diagram of an embodiment of the computing architecture of the computing system of FIG. 4, according to the present disclosure.

FIG. 5 is a system diagram illustrating an embodiment of a computing architecture 338 of an HMD 302 according to the present disclosure. In some embodiments, the computing architecture 338 may include the processing unit 324 performing a set of instructions in the CPU 326 and GPU 328 and displaying visual information to a user on a display 304.

The instructions performed by the processing unit 324 may include at least one shader 340. Examples of shaders include vertex shaders, fragment shaders (also called pixel shaders), and geometry shaders. Vertex shaders generally operate on vertices, and can apply computations of positions, colors, and texturing coordinates to individual vertices. For example, a vertex shader may perform either fixed or programmable function computations on streams of vertices specified in the memory of the graphics pipeline. Another example of a shader is a fragment shader. The outputs of a vertex shader can be passed to a fragment shader, which in turn generates fragments, the fragments including information corresponding to an individual pixel. Yet another type of shader includes a geometry shader. A geometry shader, which is typically executed after vertex shaders, can be used to generate new graphics primitives, such as points, lines, and triangles, from those primitives that were sent to the beginning of the graphics pipeline.

Operations performed by a shader 340 may use one or more external graphics-specific resources. These resources can include a constant buffer (cbuffer), texture, unordered-access-view (UAV), or sampler (sampler states), for example. Resources may be assigned positions in graphics pipeline memory called "slots" (described below) which are bound prior to execution by the GPU 328, and are typically bound at compilation time or development time. However, as described below, embodiments of the present invention assign virtual positions to those resources during compilation. Then, at a later time such as a "link-time," which may occur at runtime, once a structure of the shader is determined, the assigned virtual resource positions are remapped to the appropriate physical or actual positions of the resources.

After a shader 340 concludes its operations, the information may be placed in a GPU buffer 342. The information may be presented on an attached display 304 or may be sent back to the host for further operations.

The GPU buffer 342 provides a storage location on the GPU 328 where information, such as image, application, or other resources information, may be stored. As various processing operations are performed with respect to resources, the resources may be accessed from the GPU buffer 342, altered, and then re-stored on the buffer 342. The GPU buffer 342 allows the resources being processed to remain on the GPU 328 while it is transformed by a graphics or compute pipeline. As it is time and energy consuming to transfer resources from the GPU 328 to a memory unit (such as memory unit 330 described in relation to FIG. 4, it may be preferable for resources to remain on the GPU buffer 342 until processing operations are completed, particularly in self-contained wearable computing devices such as a HMD 302.

GPU buffer 342 also provides a location on the GPU 328 where graphics specific resources may be positioned. For example, a resource may be specified as having a certain-sized block of memory with a particular format (such as pixel format) and having specific parameters. In order for a shader 340 to use the resource, it may bound to a "slot" in the graphics pipeline. By way of analogy and not limitation, a slot may be considered like a handle for accessing a particular resource in memory. Thus, memory from the slot can be accessed by specifying a slot number and a location within that resource. A given shader 340 may be able to access only a limited number of slots (e.g., 32).

Figure 6:
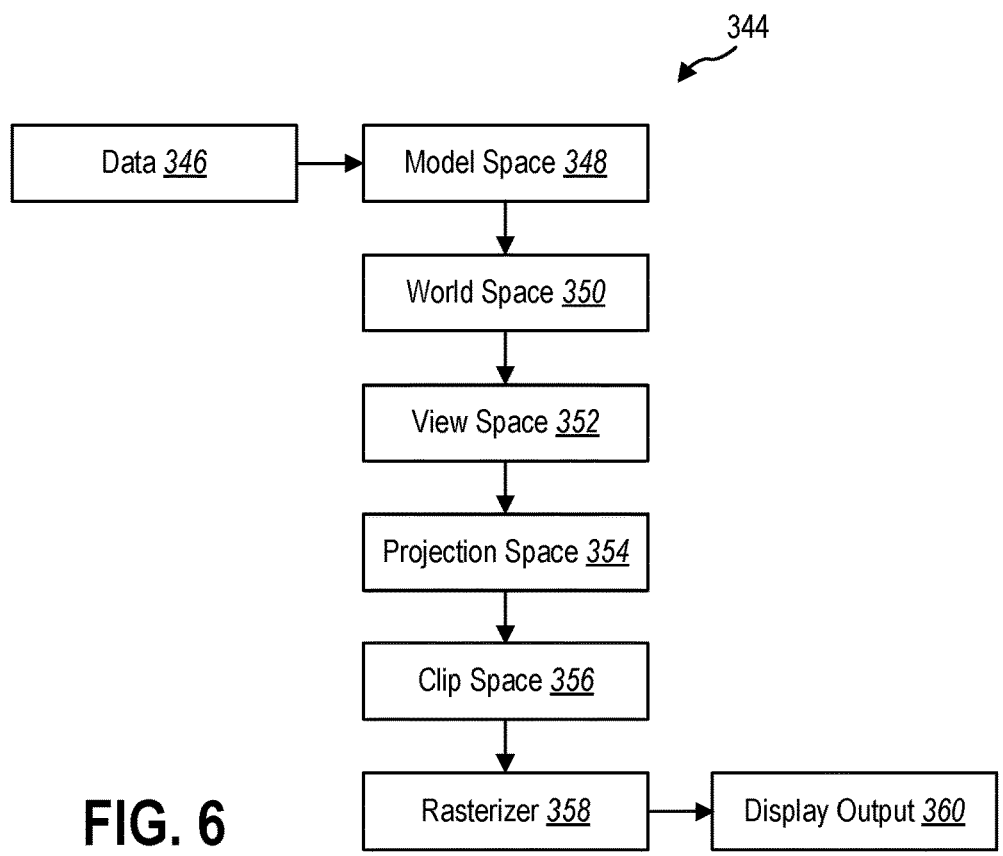
FIG. 6 is a block diagram of an embodiment of a graphical pipeline, according to the present disclosure.

FIG. 6 is a flowchart of an embodiment of a graphics pipeline 344 of a HMD 302 according to the present disclosure, for example, for rendering images of graphical objects existing in a 3D world space. The graphics pipeline 344 may be used to, for example, render an image of the object for display, via a display device (e.g., display 104 of FIG. 1), to a user. In some embodiments, the graphics pipeline 344 may be used to determine the fragments to be used for shading a pixel that may be displayed via the display. The graphics pipeline 344 may be mapped onto any combination of graphics hardware and/or software, for example, the GPU 328 described above with respect to FIG. 4.

The graphics pipeline 344 may include hardware components such as servers, controllers, databases, processors, storage drives, registers, cache, RAM memory chips, data buses, or the like and/or software components such as graphics rendering applications (e.g., including rendering engines, libraries, shader programs, etc.).

According to one embodiment, the graphics pipeline 344 may convert a 3D model or scene received from a processor into the 2D output that may be displayed via a display device. For example, the graphics pipeline 344 may receive input data 346 including, for example, a graphical model. The input data 346 may include primitive objects, which may include mathematical polygons such as triangles, quadrilaterals, or the like that may be modeled in a modeled scene such as a model space 348. Primitive objects may include or be defined by a multiple vertices representative of the corners of the primitive object and multiple edges representative of the sides of the primitive object. For example, a primitive object in the form of a quadrilateral (or "quad") would include at least four vertices and at least four edges connecting the four vertices. In some embodiments, the quad may be split into two triangles by a bisecting edge connecting opposing vertices.

In an example embodiment, a coordinate system may be established such that primitives may be properly situated in the 3D model space 348. The model space 348 may be converted into a 3D world space 350, a view space 352, and a projection space 354. It may be converted in discrete individual stages, a single stage resulting from a concatenation of matrix transforms, or any combination thereof.

The graphical pipeline 344 may clip and process primitives expressed in projection space 354 from transformation after the primitives have been transformed from view space 352, and after primitives in projection space are transformed to clip space 356. The graphical pipeline 344 may provide the clipped and processed contents of the 3D scene from the clipping unit into the rasterizer 358. According to one embodiment, the transformed projected view may be established by, for example, placing a virtual "camera" in the 3D world space 350. In one embodiment, the virtual camera may be positioned based on a location of, for example, a user that may view the 2D output via a display device. Based on the positioning of the virtual camera, a coordinate system may be established for view space 352 and projection space 354.

The graphical pipeline 344 may further rasterize the clipped scene. For example, the graphical pipeline 344 may include a rasterizer 358. According to an example embodiment, the rasterizer 358 may render primitives associated with the clipped data from clip space 356 into fragments that may form a display output 360 that is then output via a display. For example, the clipped data from clip space 356 may be divided into a two-dimensional array of pixels. The rasterizer 358 may then render the primitives into pixel areas that may form a display output 360. In some embodiments, the generation of the fragments may be performed by a fragment shader that is part of or operating in conjunction with the rasterizer 358. The rendered image of the primitive may then be output as a display output 360 to a display device (such as the display 104 described above with respect to FIG. 1).

Figure 7:
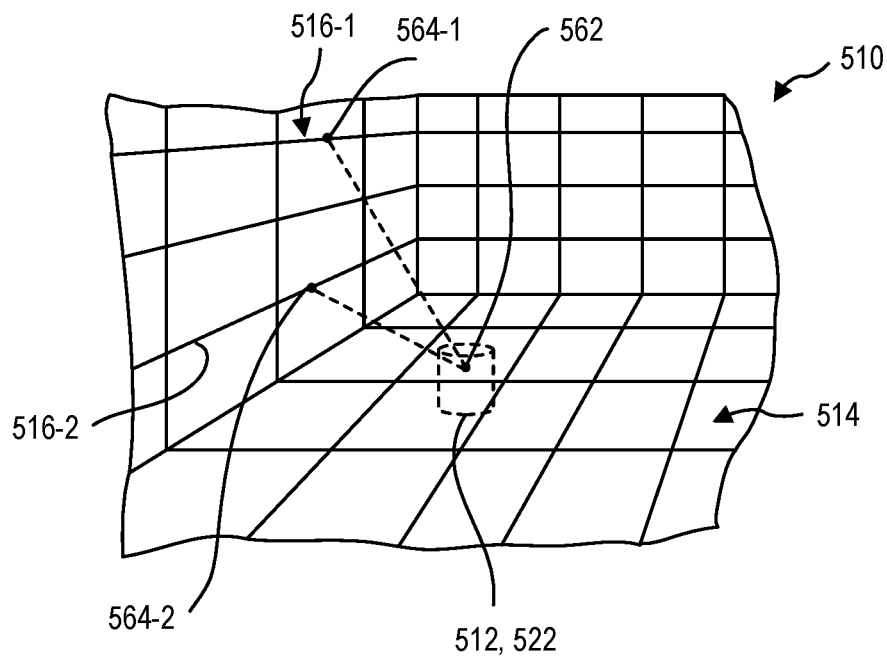
FIG. 7 is a perspective view of an embodiment of the world space of the virtual environment of FIG. 2, according to the present disclosure.

In some embodiments, a method of rendering a virtual object and/or virtual environment, according to the present disclosure, may include calculating a distance value from between two points in the world space 350. FIG. 7 illustrates the world space of a virtual environment 510, similar to that described in relation to FIGS. 2 and 3. The virtual environment 510 may include an origin object 512 and/or a virtual representation/placeholder of a physical object 522 in the physical environment. In some embodiments, the rendering of a procedurally generated object 514 in the virtual environment 510 may be altered by a shader during the procedural generation of the elements 516-1, 516-2. Each portion of the elements 516-1, 516-2 may be altered by the shader at each point within the elements 516-1, 516-2. For example, in the shader that generates the procedurally generated object 514 (such as the grid pattern), a distance parameter may be added.

The distance parameter may hold a value that represents the distance between an origin point 562 (which may be positioned in or on the origin object 512 or placeholder of a physical object 522) and a target point 564-1, 564-2. In some embodiments, the origin point 562 may be a centerpoint of the origin object 512. In other embodiments, the origin point 562 may be point on a surface of the origin object 512. In yet other embodiments, the origin point 562 may be point on a surface mesh or other mesh used to determine a boundary of an object (such as a surface mesh defining an outer boundary of a cloud of steam in the virtual environment 510).

In further embodiments, the origin point 562 may be a location of a user's gaze. For example, the HMD may include a gaze tracking system to monitor the position and direction of a user's pupil. The direction of the user's gaze may be calculated by the HMD and may be mapped onto the virtual environment to provide an origin point. In at least one example, the virtual environment may be in sharper focus at or near the point of the user's gaze with increasing amount of blur away from the area the user is viewing.

In yet further embodiments, the origin point 562 may be positioned to represent the user's perspective. For example, the origin point 562 may be located in or near the NED of the HMD. In other examples, the origin point 562 may be located in or on the user's location in the virtual environment. By locating the origin point 562 in or on the user, the system may create a depth of field effect through blurring objects or textures positioned at a greater distance in the virtual environment from the user than those closer to the user.

The distance parameter may allow for a modification of one or more values in the shader, such that the generation of the procedurally generated object 514 may be generated in relation to the distance from the origin point 562. As shown in the example depicted in FIG. 7, a first distance between the origin point 562 and a first target point 564-1 (positioned in or on the first element 516-1) may be greater than a second distance between the origin point 562 and a second target point 564-2 (positioned in or on the second element 516-2). The different distances of the first target point 564-1 and second target point 564-2 from the origin point 562 may cause the portion of the procedurally generated object 514 at the first target point 564-1 to be rendered differently than the portion of the procedurally generated object 514 at the second target point 564-2.

In at least one embodiment, the procedural generation of the grid shown in FIG. 7 may include a blur shader to generate the grid (i.e., the procedurally generated object 514) with an increasing amount of blurring at increasing distances from the origin point 562. In other words, as the grid is dynamically created by the processing unit in the virtual environment 510, the grid has a distance-based amount of blur at the moment of initial rendering. This original blurring of the procedurally generated object 514 at the time of rendering may eliminate the need for a post processing step at the end of the rendering process, thereby saving time and system resources.

The blur shader may be applied to the procedurally generated object 514 in a fragment shader by performing a distance check on the position of each point of the procedurally generated object 514 relative to an origin object 512 and/or origin point 562 during rendering (as calculated by the vertex shader previously). In some embodiments, the distance check may include a clamping function to input the distance and output an associated value for the blur shader. A clamping function returns a constant or "saturated" value for any value outside of a predetermined range. For example, the returned value may be constant below a lower limit and constant or "saturated" above an upper limit.

Figure 8:
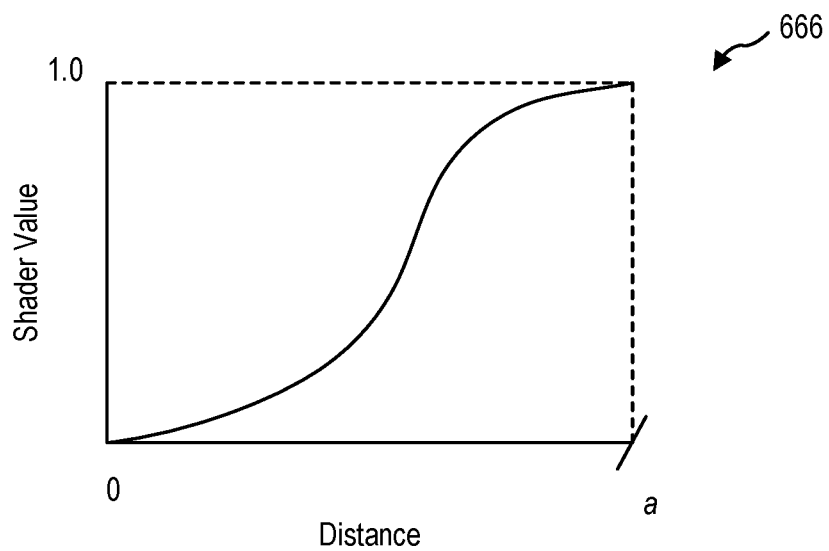
FIG. 8 is a graph illustrating an embodiment of an interpolating clamping function, according to the present disclosure.

FIG. 8 illustrates a graph 666 of a clamping function where a is a maximum value for the interpolated portion of the clamping function. More specifically, FIG. 8 illustrates a graph of a smoothstep function for the distance check. The smoothstep function may produce a curve interpolating between a low value (assuming for exemplary purposes to be 0) and a high value (assumed for exemplary purposed to be 1). The smoothstep function may be defined, generally, as:

$$S_N(x) = \begin{cases} 0 & \text{if } x \leq 0 \\ x^{N+1} \sum_{n=0}^{N} \binom{N+n}{n}\binom{2N+1}{N-n}(-x)^n & \text{if } 0 \leq x \leq 1 \\ 1 & \text{if } 1 \leq x \end{cases}$$

Where x is the distance value and N is the integer value of the polynomial. For example, in MSDN and OpenGL libraries, the basic smoothstep function implements a version in which N=1, producing a standard curve between 0 and 1 of:

$$smoothstep(x) = S_1(x) = \begin{cases} 0 & x \leq 0 \\ 3x^2 - 2x^3 & 0 \leq x \leq 1 \\ 1 & 1 \leq x \end{cases}$$

While the depicted example illustrates a range with a lower limit of 0.0 and an upper limit of 1.0, as contemplated herein, the predetermined range may be variable based on the distance between the selected points.

In some embodiments, the distance value calculated by the vertex shader between selected points may be added to and/or may be the upper limit (a) of the clamping function test as a "padding" on the upper threshold. For example, the smoothstep function, as described, may range from 0.0 to an upper value that increases with increasing distance between the points. The value returned by the smoothstep function in the fragment shader may be used to generate gradual softening of line edges, thus fading effects of the blur are generated. Because the curve between the lower value and upper value returns the interpolated amount of blurring relative to a point, increasing the threshold on the distance test may increase the amount of blurring for that point.

The smoothstep function, when used in a blur shader, therefore, may return a degree of blurring to be applied to a procedurally generated object being rendered, where the amount of blurring is based at least partially upon the distance calculated by a vertex shader between the point of the procedurally generated object being rendered and an origin point.

Figure 9:
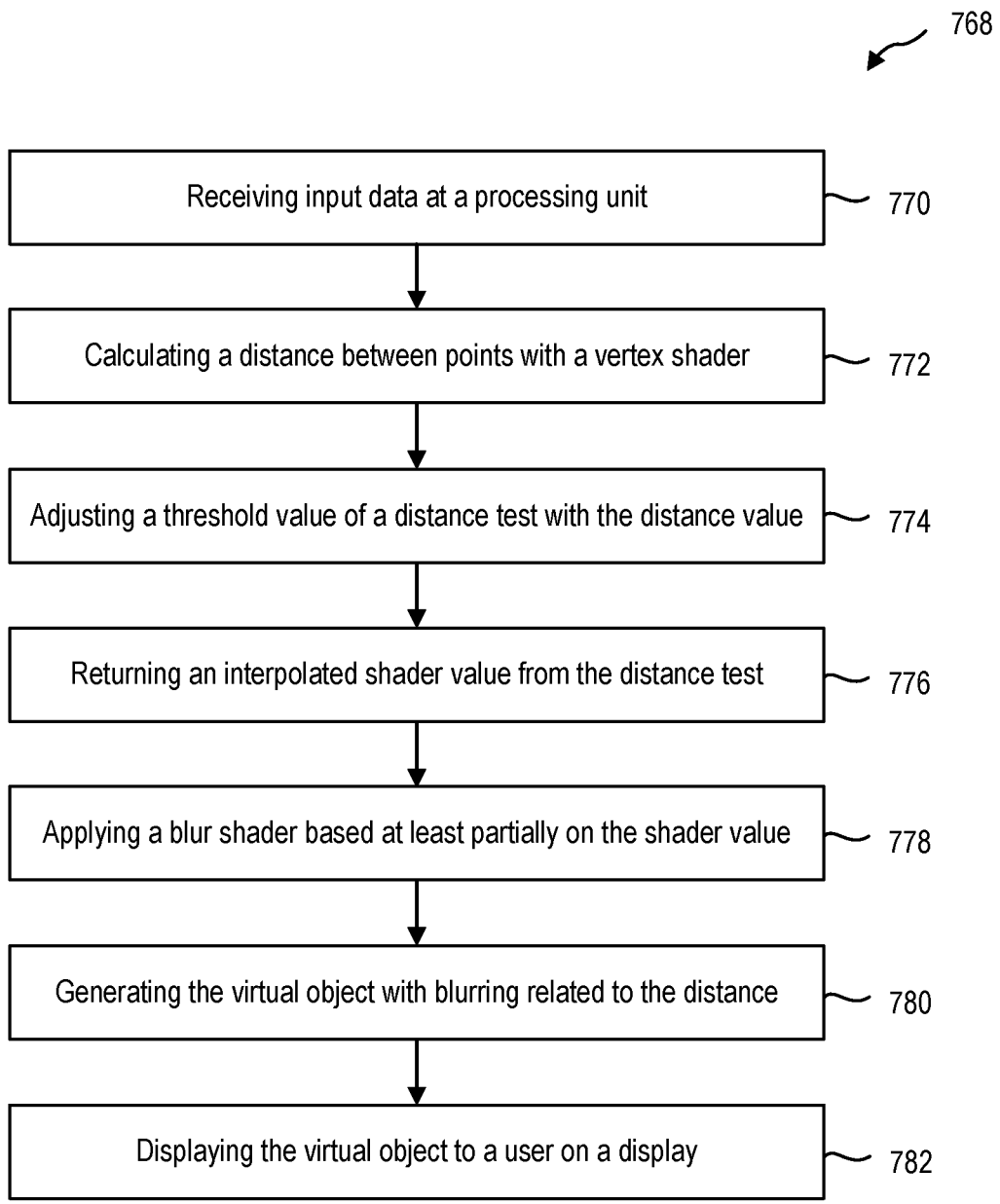
FIG. 9 is a flowchart illustrating an embodiment of a method of rendering a blurred procedurally generated object in a virtual environment, according to the present disclosure.

FIG. 9 is a flowchart illustrating an embodiment of a method 768 of rendering a procedurally generated object with a real-time distance-based blurring of the procedurally generated object relative to another object. The method 768 may include receiving input data at a processing unit at 770. The input data may originate from system memory, an internal storage device, an external storage device, a network location, from the processing unit calculations, from a sensor (such as the camera 108 described in relation to FIG. 1), or combinations thereof. The input data may provide at least some of the information to define one or more elements of a procedurally generated object in a virtual environment.

The method 768 may further include calculating a distance between points in the virtual environment with a vertex shader at 772. At least one of the points is located in or on the procedurally generated object, and a second point may be an origin point located independently of the procedurally generated object. The distance between the points may be calculated in three-dimensional space and be returned as a scalar distance value.

The distance value may be delivered to a fragment shader and used in adjusting a threshold value of a distance test at 774. For example, the distance test may be a clamping function, smoothstep function, or any related function with a lower limit and an upper limit. The lower limit and upper limit may be threshold values of the distance test, and the distance value calculated by the vertex shader may be used to adjust one or both of the threshold values. For example, the distance value may be added to the upper limit of distance test to expand the range of values over which the function may interpolate between constant values.

After adjusting the threshold value with the distance value, the method 768 may include returning an interpolated shader value from the function used in the distance test at 776. The returned value may include a plurality of returned values along the interpolated curve between the lower limit and upper limit of the function. The shader value(s) may be used in applying a blur shader at 778. In some embodiments, the shader value may be a coefficient of the blurring effect applied by the blur shader, while in other embodiments, the returned shader value may be further changed to achieve a desired blurring profile that is different from the profile of the smoothstep function or other function used in the distance test.

Once the blur shader is applied to the points of the procedurally generated object at 778, the method 768 includes generating the virtual object with the blurring related to the distance value at 780. The procedurally generated virtual object may then be displayed to a user on a display, such as the NED 104 or other display device described in relation to FIG. 1, at 782.

A system according to the present disclosure may enable presentation and interaction with virtual objects through one or more virtual or physical objects at a simulated position on a far side of the one or more virtual or physical objects. Interacting with virtual objects at a location beyond the limitations of the physical or virtual environment in which the user is constrained may reduce fatigue, improve ease-of-use, and increase functionality over conventional presentation of virtual information.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. An electronic system for displaying visual information to a user, the electronic system comprising:
   a head-mounted display (HMD) including a near-eye display (NED);
   a microprocessor in data communication with the NED; and
   a storage device in data communication with the microprocessor, the storage device having instructions stored thereon which, when executed by the microprocessor, cause the microprocessor to:
      identify an origin point and target point, the target point being part of a virtual object that is procedurally generated by the microprocessor,
      calculate an object distance between the origin point and the target point in three-dimensional space,
      adjust a threshold value of a distance test using the object distance,
      determine an interpolated shader value for the target point based on the distance test using a clamping function,
      apply a shader to the target point to create a shaded virtual object, and
      display the shaded virtual object to the user with the NED.

2. The system of claim 1, wherein the microprocessor and storage device are located in a housing of the HMD.

3. The system of claim 1, further comprising a camera in data communication with the microprocessor, wherein the camera is configured to detect a physical object and where in the origin point is associated with the physical object.

4. The system of claim 1, wherein the NED is an optical waveguide and at least partially transparent to a user.

5. The system of claim 1, further comprising a gaze tracking system configured to monitor a user's eye and calculate the origin point.

6. A method of presenting visual information to a user, the method comprising:
   identifying an origin point and target point, the target point being part of a virtual object that is procedurally generated by a microprocessor;
   calculating an object distance between the origin point and the target point in three-dimensional space;
   adjusting a threshold value of a distance test with the object distance;
   determining an interpolated shader value for the target point from the distance test using a clamping function;
   applying a shader to the target point to create a shaded virtual object; and
   displaying the shaded virtual object to the user with a near-eye display (NED).

7. The method of claim 6, wherein the shader is a blurring shader, and the shaded virtual object is a blurred virtual object.

8. The method of claim 6, wherein adjusting a threshold value includes adjusting lower limit and/or an upper limit of the distance test.

9. The method of claim 6, wherein the clamping function is a smoothstep function.

10. The method of claim 6, wherein the clamping function has a lower limit and an upper limit, and the lower limit and/or upper limit is at least partially dependent on the object distance.

11. The method of claim 6, wherein the origin point is associated with a physical object.

12. The method of claim 6, wherein the origin point is in or on the user.

13. The method of claim 12, the origin point being in or on the NED.

14. The method of claim 6, wherein the origin point is calculated based partially on a direction of a gaze of the user.

15. The method of claim 6, further comprising imaging a surrounding physical environment of the user with a camera.

16. The method of claim 6, wherein calculating the object distance is performed with a vertex shader.

17. The method of claim 6, wherein applying a shader to the target point is performed with a fragment shader.

18. The method of claim 6, wherein determining an interpolated shader value is performed in a graphical processing unit.

19. A non-transitory computer readable medium, the non-transitory computer readable medium having instructions stored thereon that, when executed by a microprocessor, cause the microprocessor to perform a method comprising:
   identifying an origin point and target point, the target point being part of a virtual object that is procedurally generated by the microprocessor;
   calculating an object distance between the origin point and the target point in three-dimensional space;
   adjusting a threshold value of a distance test with the object distance;
   determining an interpolated shader value for the target point from the distance test using a clamping function;
   applying a shader to the target point to create a shaded virtual object; and
   displaying the shaded virtual object with a near-eye display (NED) for viewing by a user.

20. The non-transitory computer readable medium of claim 19, wherein the distance test is a smoothstep function, and adjusting a threshold value includes adjusting lower limit and/or an upper limit of the distance test.

* * * * *